Feb. 16, 1926. 1,573,629
J. H. CARVER
METHOD OF MAKING BLANKS FOR NOISELESS GEARS
Filed Feb. 19, 1924
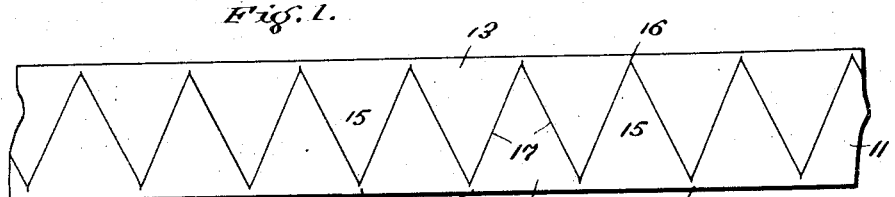
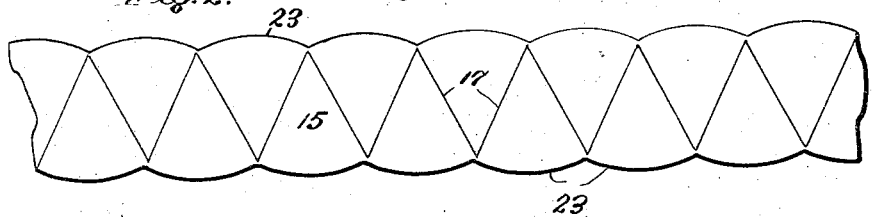
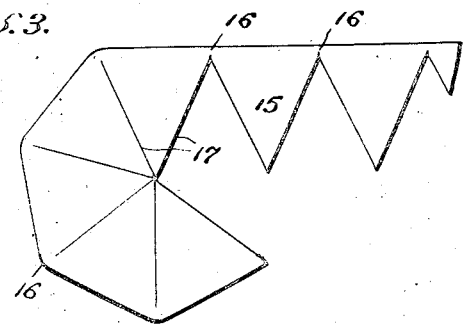
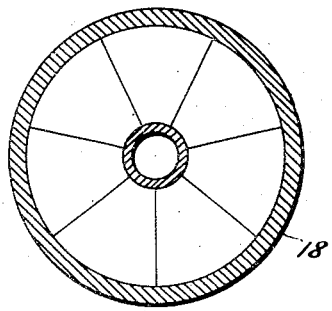
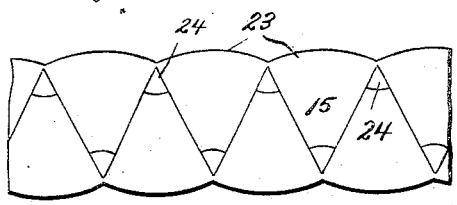
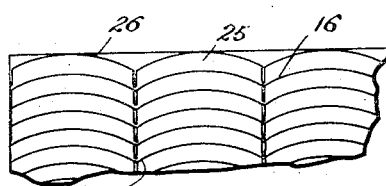
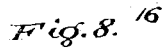
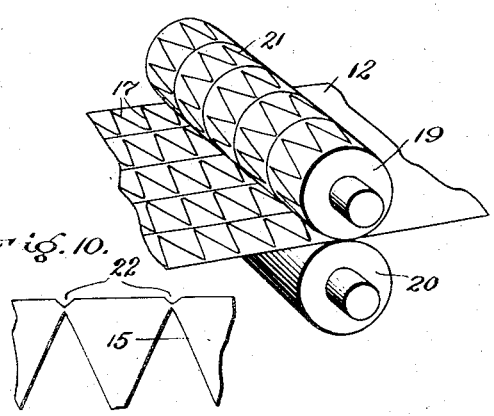
Inventor:
James H. Carver,
by [signature]
His Attorney Patented Feb. 16, 1926.

1,573,629

UNITED STATES PATENT OFFICE.

JAMES H. CARVER, OF CARMAN, NEW YORK, ASSIGNOR TO GENERAL ELECTRIC COMPANY, A CORPORATION OF NEW YORK.

METHOD OF MAKING BLANKS FOR NOISELESS GEARS.

Application filed February 19, 1924. Serial No. 693,938.

*To all whom it may concern:*

Be it known that I, JAMES H. CARVER, a citizen of the United States, residing at Carman, county of Schenectady, State of New York, have invented certain new and useful Improvements in the Method of Making Blanks for Noiseless Gears, of which the following is a specification.

The present invention relates to that type of noiseless gears which are made of woven spinnable textile fibers such as canvas or duck, arranged in layers and a binding material with which the material is coated and which serves to unite the layers and hold the fibers under suitable compression.

In the manufacture of such gears the principal item of expense is the canvas or duck. Other items of expense are that of cutting the material and assembling the parts which go to make up the finished gear blank.

The object of my invention is to decrease the cost of making gears of the above mentioned type without, however, impairing their usefulness. This is accomplished by a novel cutting of the canvas or duck which practically eliminates waste, and which also facilitates assembling by simplifying the operation.

For a consideration of what I believe to be novel and my invention, attention is directed to the accompanying description and the claims appended thereto.

In the accompanying drawing which is illustrative of my invention, Fig. 1 is a plan view of a piece of canvas or duck cut in accordance with my improved method of manufacture; Fig. 2 is a similar view in which the shape of the several elements is slightly modified; Fig. 3 illustrates the way the strip is coiled to form a disk or helix; Fig. 4 is a view generally similar to Fig. 2 with the exception that the spaces of the pieces are cut away to make provision for a metal hub in the blank; Fig. 5 shows a method of making rings, rims or washers; Fig. 6 is a plan view of a fixture for assembling the blanks; Fig. 7 is a perspective view of cutting rolls; Fig. 8 is a sectional view of a gear blank; Fig. 9 is a sectional view of a modified form of blank, and Fig. 10 shows a modified way for cutting the elements.

In carrying out my invention, I may start with a narrow strip of canvas or duck 11 such as is shown in Fig. 1 or with a sheet 12 such as is shown in Fig. 7. The duck is preferably coated or treated with a binder such as bakelite, or equivalent material before being cut since it renders the cutting operation easier as the fibers are bound together and hence the tendency of the material to fray out at the edges is obviated, but under some circumstances the binder may be applied afterwards. The strip is then cut into two main pieces or ribbons 13 and 14 each having a plurality of V-shaped projections or elements 15. It is to be noted that the several projections or elements are united along their base ends or edges by a few of the threads of the material usually the warp threads as indicated at 16. The purpose of this form of cutting is first to save stock and second to facilitate assembling. The size of the elements and the angles of the cuts 17 are such that when the saw-toothed ribbon formed by the cutting operation is coiled to form a disk in the manner shown in Fig. 3, the edges of adjacent elements will be in contact or practically so. As shown the cutting is such that seven elements form a complete disk but the number may be greater or less as desired. Assuming that seven elements are necessary to complete a disk, I may sever the warp connecting threads 16 at every seventh element, or the operator may wind the ribbon round and round to form a helix. Whether the former or latter method is employed the elements are assembled in a fixture, such for example as that shown in Fig. 6. Such a fixture comprises a metal annulus 18 having top and bottom heads, not shown.

In Fig. 7 is shown a cutting arrangement whereby a sheet of stock may be cut into strips and each strip cut into two saw-toothed ribbons of the character shown in Fig. 1 in one operation. By suitably shapping the cutting surfaces the ribbons may be of the form shown in Figs. 1, 2, 4 or 5 as desired.

Briefly, the cutter comprises a pair of suitably supported rolls 19 and 20, one or both of which are positively driven from a source of power. The roll 19 has cutting edges 21 of suitable size and shape for the work to be performed.

As previously stated the elements 14 are connected together by a few threads, the point being to use as few threads as possible for the purpose and at the same time ensure a connection sufficiently good to prevent the elements from separating during subsequent operations. When the sheet material is relatively thin the elements may be formed into a disk or helix without causing undue bunching or puckering where the threads 16 connect the elements. If the sheet is relatively thick this bunching or puckering can be reduced to a negligible amount by cutting small notches 22, Fig. 10, directly in line with the main diagonal cuts.

In assembling the disks to form the blank it is desirable to stack the disks one on top of the other in the fixture in such manner that the elements in one layer overlap the joints between elements in the adjacent layers both above and below.

In some cases it is preferable to form the ribbons as shown in Fig. 2. That is to say each element has two straight converging sides or edges with a curved base 23 the radius of which corresponds approximately to that of the finished blank. In such a construction there is a very small amount of waste stock due to said curvature. There is also a very small amount of stock in the structure shown in Fig. 3 which has to be turned off of the periphery of the finished blank to make it round.

Where the blank has a metal center to receive the driving shaft, provision is made therefor by removing a small piece of stock from the apex of each element as indicated at 24 in Fig. 4. This may be done at the time the ribbon is formed.

A gear blank made in accordance with my invention may have parallel sides as shown in Fig. 8 or it may have a relatively thin web and thickened hub and rim as indicated in Fig. 9. The thickening of the rim may be obtained by inserting washers between the disks near their outer edges. The preferred way is to intersperse the disks and washers so that the latter will be firmly tied or anchored in place. The hub may be thickened by using washers or by using the trimming remaining after the ribbons are cut. In case trimmings are used they may be chopped up and the small pieces thus formed placed between the disks or the chopped up material may be suitably molded before being mounted in the fixture.

In Fig. 5 is shown a means for making washers out of segmental pieces 25 of appropriate size and shape. The segments are cut from a sheet in the same general manner as the pieces 14 but instead of being connected one to the other at their outer edges by threads 16 are connected by such threads at their inner edges. Connecting these pieces at their inner edges renders it easier in the assembling operation to place the same in the fixture 18 with the peripheral surfaces 26 engaging the inner wall of the fixture. The joints between segments in one layer should break-joint with those in the next layer. By preference the outer and inner edges of these segmental pieces have the same radius of curvature so as to avoid waste in cutting. As a result of this each piece is slightly wider in the center than at the ends. This is an additional reason for stacking the segments in the fixture in a manner to break-joint.

After the elements are formed a suitable number is stacked in the fixture and thereafter they are subjected to heat to soften the binder and then to pressure and greater heat to consolidate the mass, compress the fibers and cause the binder to harden and retain the fibers in their compressed state. This is the usual process, briefly stated, for completing the blanks and therefore need not be described in detail nor the means for finishing the blank and cutting the gear teeth.

In accordance with the provisions of the patent statutes I have described the principle of operation of my invention, together with a particular method and apparatus which I now consider to represent the best embodiment thereof, but I desire to have it understood that the particular method and apparatus disclosed are only illustrative, and that the invention can be carried out with such modifications as come within the scope of the appended claims.

What I claim as new and desire to secure by Letters Patent of the United States, is,—

1. The method of making blanks for gears and the like which comprises taking woven textile material which has been treated with a binder, cutting the material into strips in such manner that each strip has a plurality of segmental elements which are joined along one edge only by a few threads, the elements of said strips being counterparts, assembling the strips in a circular mold to form a stack by bending them at said connecting threads, and finally subjecting the stack to heat and pressure to cause the binder to hold the material under compression.

2. The method of making blanks of the character described which comprises treating a piece of woven textile material with a binder, cutting the same to form strips, each with definitely shaped counterpart elements, leaving at one edge of each strip and between adjacent elements a connecting link comprising a few threads, assembling the strip material in a circular mold by bending the connecting threads and so arranging the elements that the side edges of one contact with similar edges of other elements, and finally subjecting the body to heat and pressure to cause the binder to hold the fibers of the material under compression.

3. The method of making blanks of the character described, which comprises cutting a strip of textile material which has been treated with a binder into two ribbons by diagonal cuts in such manner as to form V-shaped elements on each ribbon, said cuts terminating short of the side edges of the strip so that the elements in each ribbon are connected one to the other by a few threads, cutting the base ends of the elements on a radius which corresponds approximately to the radius of curvature of the finished blank, assembling the ribbon in a circular mold by bending the same at the connecting threads, and finally subjecting the body thus formed to heat and pressure and cause the binder to hold the fibers of the material under compression.

4. The method of making elements for blanks of the character described which comprises cutting a strip of textile material that has been treated with a binder into two ribbons by diagonal cuts in such manner as to form V-shaped elements in each ribbon, said cuts terminating short of the side edges of the strip so that the elements in each ribbon are connected one to the other, cutting the base ends of the elements on a radius which corresponds approximately to the radius of curvature of the finished blank, and cutting off the apexes of the elements to afford a space for the hub of the finished blank.

5. The method of making blanks of the character described which comprises cutting a piece of textile material which has been treated with a binder so as to form narrow segments each having curved inner and outer edges and leaving between each two segments so formed a few connecting threads, assembling the segments in a mold to form a part of the rim by bending the connecting threads, adding additional material to form the web and part of the rim and finally subjecting the rim and web to heat and pressure to cause the binder to hold the fibers of the material under compression.

In witness whereof, I have hereunto set my hand this 18th day of February, 1924.

JAMES H. CARVER.